United States Patent
Nakanishi et al.

(10) Patent No.: US 7,387,450 B2
(45) Date of Patent: Jun. 17, 2008

(54) OPTICAL RECEPTACLE HAVING STUB CAPABLE OF ENHANCING OPTICAL COUPLING EFFICIENCY AND OPTICAL MODULE INSTALLING THE SAME

(75) Inventors: Hiromi Nakanishi, Kanagawa (JP); Masaki Furumai, Kanagawa (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 11/283,054

(22) Filed: Nov. 21, 2005

(65) Prior Publication Data

US 2006/0133740 A1    Jun. 22, 2006

(30) Foreign Application Priority Data

Nov. 22, 2004    (JP)    ............ P. 2004-337773

(51) Int. Cl.
*G02B 6/36*    (2006.01)
(52) U.S. Cl. .................................................... 385/88
(58) Field of Classification Search ........................ None
See application file for complete search history.

(56) References Cited

U.S. PATENT DOCUMENTS

| | | | | |
|---|---|---|---|---|
| 3,910,677 A * | 10/1975 | Becker et al. ............... 385/33 |
| 5,315,680 A * | 5/1994 | Musk et al. ................. 385/88 |
| 5,537,504 A * | 7/1996 | Cina et al. .................. 385/93 |
| 6,966,705 B2 * | 11/2005 | Sato et al. .................. 385/88 |
| 7,036,998 B2 * | 5/2006 | Tonai et al. ................. 385/88 |
| 7,090,412 B2 * | 8/2006 | Kato et al. .................. 385/93 |
| 7,137,745 B2 * | 11/2006 | Uekawa ....................... 385/93 |
| 2001/0024551 A1 * | 9/2001 | Yonemura et al. ........... 385/88 |
| 2002/0168153 A1 * | 11/2002 | Yamabayashi et al. ...... 385/88 |

FOREIGN PATENT DOCUMENTS

JP        10-332988        12/1998

* cited by examiner

*Primary Examiner*—Sung Pak
*Assistant Examiner*—Chad H Smith
(74) *Attorney, Agent, or Firm*—Smith, Gambrell & Russell, LLP

(57) ABSTRACT

The present invention provides an optical receptacle capable of reducing the optical coupling loss with the connector plug to be mated with the receptacle, and an optical module installing the receptacle. The receptacle of the invention includes an optical waveguide, a stub, and a body. The stub includes a first bore, into which the waveguide is disposed, and a second bore. The waveguide may be made of same material as that constituting the core of the optical fiber, and may have a substantially same diameter as that of the cladding. Thus, the aperture for coupling the optical fiber may be expanded.

16 Claims, 5 Drawing Sheets

OPTICAL RECEPTACLE HAVING STUB CAPABLE OF ENHANCING OPTICAL COUPLING EFFICIENCY AND OPTICAL MODULE INSTALLING THE SAME

BACKGROUND OF THE INVENTION

1. Field of the Invention

The present invention relates to an optical receptacle with a stub that is capable of increasing the optical coupling efficiency with an optical fiber, and an optical module installing the optical receptacle.

2. Related Prior Art

As a conventional optical receptacle having the so-called co-axial shape, Japanese Patent published as H10-332988 has disclosed one typical configuration with a built-in ferrule securing an optical fiber therein. To mate an optical plug ferrule with the receptacle above may accomplish the optical coupling between the optical fiber and the optical device accompanied with the optical receptacle.

However, the conventional built-in ferrule provides a guide fiber, typically a single mode fiber, to guide light, which reduces coupling tolerance between the external fiber inserted into the receptacle and the guide fiber within the built-in ferrule. Accordingly, the optical coupling characteristic degrades by iterating the insertion/extraction of the external ferrule, or the optical coupling loss increases when an axial stress is applied to the receptacle that receives the external plug.

Therefore, the present invention is to provide an optical receptacle that enables to reduce the dispersion in the optical coupling efficiency when the receptacle receives the external optical plug, and to provide an optical module installing the optical receptacle.

SUMMARY OF THE INVENTION

One aspect of the present invention is directed to an optical receptacle that receiver an optical connector plug. The optical receptacle includes at least a waveguide, a stub, and a sleeve. The stub includes first and second bores, a diameter of the former being smaller than that of the latter. The waveguide, may be made of silica glass, i.e., a material having substantially same refractive index with the core of the optical fiber, is fully secured within the first bore. That is, the waveguide is homogeneous in the refractive index thereof within the first bore. The sleeve receives a portion of the stub in a first portion, while receives the optical connector plug in a second portion opposite to the first portion to abut against the stub together with the waveguide.

The diameter of the first bore may be substantially equal to the diameter of the optical fiber at an interface between the first and second bores. Moreover, the diameter of the second bore is greater than that of the first bore. Accordingly, the light propagating in the optical fiber is not blocked by the stub, which suppresses the reduction of the optical coupling loss at the optical receptacle due to the misalignment between the core of the optical fiber and the waveguide, or the external force applied to the sleeve along the axial direction thereof.

The waveguide, integrated with the stub, may have a convex surface at a side opposite to the second bore. This enables the tip of the waveguide to come in physically contact to the optical fiber. Accordingly, a coupling loss derived from the Fresnel reflection at the contact may be reduced. Moreover, by setting the refractive index of the waveguide substantially equal to that of the optical fiber, the reflection at the contact may further reduced. The waveguide may be made of silica glass, which is the same material with the core of the fiber.

The interface between the first and second bores of the stub may be inclined with respect to the optical axis of the sleeve. Here, the optical axis of the sleeve is identical with that of the stub. This inclined surface at the interface may prevent the light from reflecting to the incoming direction, thereby suppressing the optical noise when the light-emitting device such as semiconductor laser diode is coupled with the optical receptacle.

The optical receptacle may further include a sleeve cover and a bush. The bush press-fits the stub in a side of the second bore. The sleeve cover protects the sleeve and the stub, and is press-fit with the bush. That is, the bush is press-fit between the stub and the sleeve cover.

Another aspect of the present invention relates to an optical module that installs the optical receptacle mentioned above, an optical device including a semiconductor optical device, and an alignment member arranged between the optical receptacle and the optical device to couple in optical therebetween. The semiconductor optical device may be a semiconductor laser diode for a transmitting optical device, or may be a semiconductor photodiode for a receiving optical device.

Since the diameter of the first bore of the stub is substantially equal to that of the optical fiber to be inserted into the sleeve, the light emitted from the laser diode, when the optical module is the transmitting module, may be not blocked by the stub, and may enter in almost whole portion thereof the optical fiber. Moreover, the degradation of the optical coupling efficiency between the optical fiber and the laser diode may be suppressed even the external force is applied to the sleeve in the axial direction.

DESCRIPTION OF PREFERRED EMBODIMENTS

Next, preferred embodiments according to the present invention will be described as referring to accompanying drawings.

Figure 1:
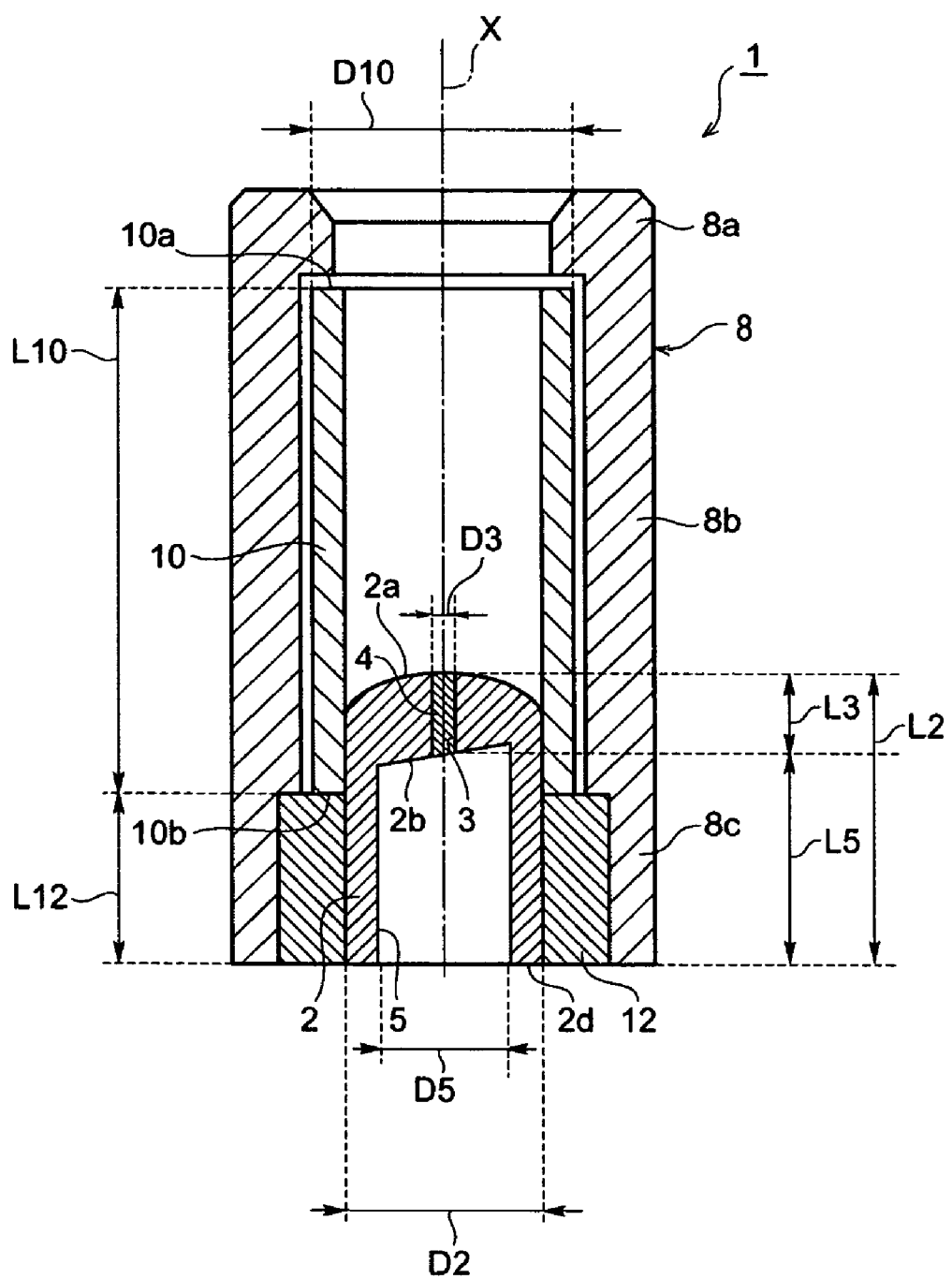
FIG. 1 is a cross section of the optical receptacle according to the present invention.
Figure 2:
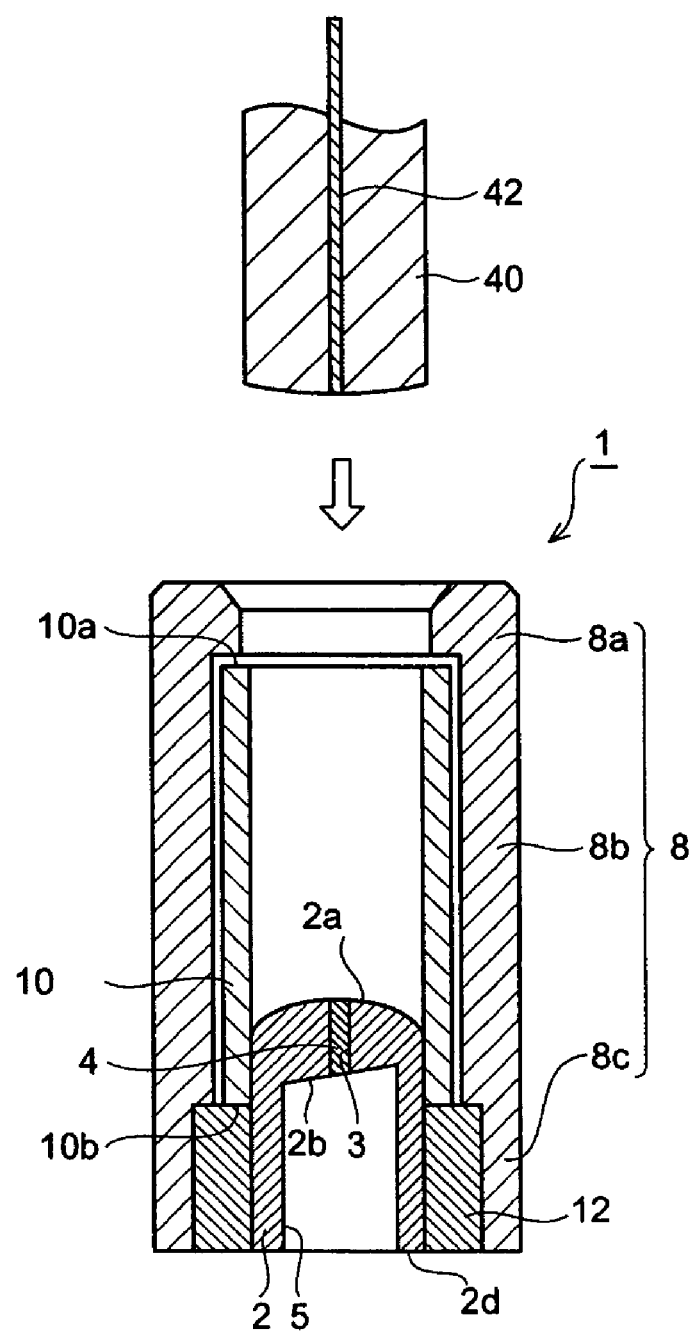
FIG. 2 is shows the optical receptacle to be mated with the optical plug.

FIG. 1 is a cross section of an optical receptacle according to a first embodiment of the invention, and FIG. 2 is a cross section of the optical receptacle shown in FIG. 1 with an optical plug to be mated with an optical receptacle. As shown in FIGS. 1 and 2, the optical receptacle 1 comprises a stub 2, an optical waveguide 4, a sleeve cover 8, a sleeve 10, and a bush 12. The stub 2 supports the optical waveguide 4 by covering the outer surface of the waveguide 4. Specifically, the stub 2 extends along a longitudinal direction, the X-direction in FIG. 1, of the sleeve cover 8 with a cylindrical configuration. The stub 2 may be made of hard material, for instance ceramics such as zirconia or metal to secure the dimensional accuracy. When zirconia is applied, the stub 2 may be made of injection forming. The stub 2 has a length L2 about 3 mm and an outer diameter D2 about 1.25 mm. This length L2 is determined by a condition that, when the external connector plug 40 is mated therewith, the plug 40 may be securely held by the sleeve 10.

Furthermore, the stub 2 includes a first bore 3 and a second bore 5. The former bore 3, holding the optical waveguide 4, extends from an inner surface 2b to an end surface 2a to form an opening. A diameter D3 of this opening is comparable to a diameter of the cladding of the optical fiber 42 secured with the connector plug 40, which is around 0.125 mm. The length L3 of the first bore 3 is set to be from 0.5 to 1.0 mm.

The second bore 5, continuous to the first bore 3, extends from the inner surface 2b to the other end surface 2d of the stub 2. A diameter of the second bore D5 is greater than that of the first bore 3, D3. The second bore 5 is vacant without any filler. Accordingly, the propagation of light does not degrade during propagating in the second bore 5. The inner diameter of the second bore D5 may be about 0.75 mm.

The optical waveguide 4 is transparent for the light propagating within the optical fiber 42 and extends along the longitudinal direction X to optically couple with the optical fiber 42. The optical waveguide 4 may be made of material with a homogeneous distribution in the refractive index thereof. In the present embodiment, the waveguide 4 is made of silica glass with a refractive index equal to the core of the optical fiber 42. Accordingly, the Fresnel reflection at the interface between the optical fiber 42 and the waveguide 4 can be suppressed. The stub 2, in particular the waveguide 4 thereof, is formed by filling melted glass within the first bore 3 to form the waveguide 4 together with the first bore 3. In an alternative, the waveguide 4 may be formed by inserting a drawn waveguide 4 into the first bore 3 and by adjusting the length of the waveguide 4 and the stub 2. Moreover, the waveguide 4 may be made of plastic depending on the material of the optical fiber 42. That is, when the optical fiber is a plastic fiber, a plastic material may be applied for the waveguide 4.

The waveguide 4 in the outer shape thereof traces the first bore 3. The waveguide 4 has an outer diameter substantially equal to the diameter of the cladding of the optical fiber 42.

The end surface 2a of the stub 2 is polished together with the waveguide 4 in a convex shape to come the plug 40 in physically contact thereto in order to prevent the Fresnel reflection at the interface between the stub 2 and the plug 40. While, the inner surface 2b is inclined together with the end surface of the waveguide 4, by a predetermined angle with respect to the longitudinal axis X. This predetermined angle is determined such that the light reflected at the inner surface 2b, or the end surface 2b of the waveguide 4, does not propagate to the in-coming direction, and the angle is preferably greater than 4° and smaller than 10°. One alterative is, instead of inclining the surface, to coat the end surface 2b with an anti-reflection coating whose reflectivity is smaller than 1%.

The sleeve 10 is to be mated with the connector plug 40 and has a cylindrical shape extending along the longitudinal direction. The sleeve cover 8 includes a front portion 8a, a middle portion and an end portion 8c. The end portion 8c has an inner diameter greater than that of the middle portion 8b. The front portion 8a is chamfered in an opening thereof to facilitate the insertion of the connector plug 40 therein. The sleeve cover 8 may be made of metal such as SUS 303 stainless steel. However, the material of the sleeve cover 8 may be not restricted to metal. For example, a resin made sleeve cover may be applicable when the other components of the receptacle 1 are made of resin and an adhesive is used for assembling these members.

The sleeve 10, disposed within the middle portion 8b of the sleeve cover 8, may be a so-called split sleeve with a slit along the longitudinal axis X. The front side 10a of the sleeve 10 receives the connector plug 40, while the rear side 10b thereof receives a portion of the front side 2a of the stub 2. The sleeve 10 may be made of ceramics such as zirconia and aluminum oxide, metal such as phosphor bronze, or plastics. The length L10 and the outer diameter D10 of the sleeve 10 may be about 5 mm and 1.3 mm, respectively. The sleeve 10 may be a rigid sleeve without any slit.

The bush 12 is disposed within the end portion 8c of the sleeve cover 8 so as to continue the sleeve 10. That is, the bush 12 is put between the sleeve cover 8 and the stub 2 to fix the stub 2 against the sleeve cover 8. The bush 12 may be made of metal, for example, SUS 303 stainless steel, and may have a length L12 thereof about 1 mm.

Thus configured optical receptacle 1 may be assembled as follows. First, the end portion 2d of the stub 2 is press-fit into the bush 12. Subsequently, the sleeve 10 and the stub 2, the end portion 2d of which is fit to the bush 12 while the front portion thereof is inserted into the sleeve 10, are inserted into the sleeve cover 8 so as to press-fit the bush 12 into the end portion 8c thereof.

In the optical receptacle 1 thus configured, the connector plug 40 is inserted into the sleeve 10, abuts against the stub 2, and, accordingly, the optical fiber 42 within the connector plug 40 may be optically coupled with the waveguide 4. Since the waveguide 4 is made of silica glass, which is transparent to the light coming therein with a homogeneous distribution in the refractive index and has the diameter greater than that of the core of the optical fiber 42, the tolerance for the optical coupling with the optical fiber 42 can be expanded. This reduces the degradation in the optical coupling efficiency by iterating the insertion/extraction of the connector plug 40 into/from the optical receptacle 1. Moreover, even when the optical receptacle 1 receives a stress along the diameter thereof when the connector plug 40 is inserted therein, the degradation in the optical coupling efficiency between the optical plug 40 and the receptacle 1 may be suppressed, which reduces the optical coupling loss.

Since the peripheral of the waveguide 4 is covered by the stub 2, the waveguide 4 may be protected from a scratch or a crevice contrary to the conventional case when the waveguide 4 is directly fixed to the sleeve cover 8 or the sleeve 10. Moreover, the second bore 5 of the stub 2 has the larger diameter than that of the waveguide 4 and is left vacant therein, which reduce the material cost of the stub 2 without degrading the propagation characteristic of the light.

Figure 3:
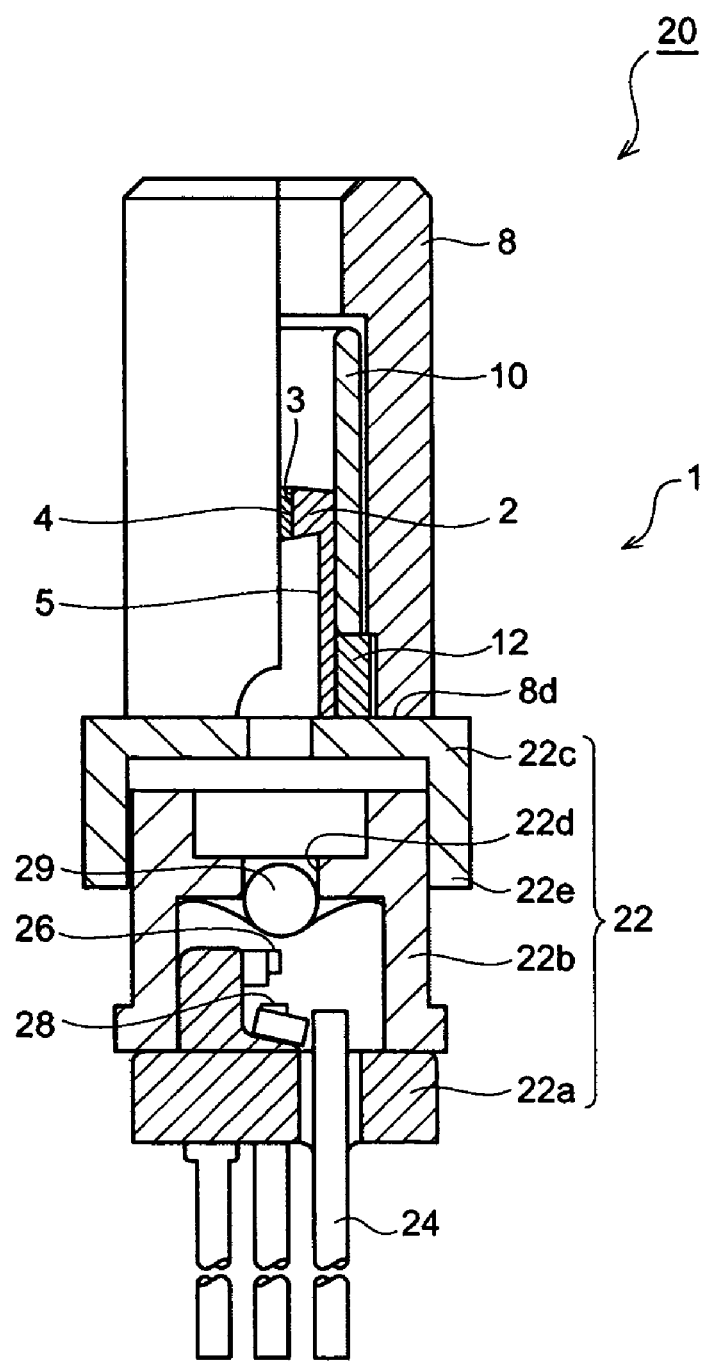
FIG. 3 is a partially sectional view of the optical module providing the optical receptacle shown in FIG. 1.

Next, an optical module equipped with the optical receptacle 1 described above will be explained. FIG. 3 is a cross section of such optical module 20, which comprises the optical receptacle 1 and an optical device 22 in the rear side of the receptacle 1.

The optical device is fixed to the sleeve cover 8. Specifically, the optical device 22 includes a stem 22a, a cap 22b, and an alignment member 22c. The stem 22a has a plurality of lead pins 24, and installs a light-emitting device 26 that emits light to the waveguide 4, and a light-receiving device 28 for monitoring the optical output from the light-emitting device 26.

These devices, 26 and 28, are electrically connected to the lead pin 24. The light-emitting device 26 may be a laser diode with a Fabry-Perot (FP) configuration or a distributed feedback (DFB) configuration made of compound semiconductor material including InP. The light-emitting device 28 may be a PIN-photodiode (PIN-PD) made of semiconductor material including InGaAs.

The cap 22*b* has an opening 22*d* on the ceiling thereof into which a lens is disposed to concentrate the light emitted from the light-emitting device 26 into the waveguide 4. The lens 29 may be a spherical lens, as shown in FIG. 3, or an aspheric lens.

The alignment member 22*c* includes a cylindrical portion 22*e* with a bore, a diameter of which is comparable to the outer diameter of the cap 22*b* to receive the cap 22*b* therein. The end surface opposite to the cylindrical portion 22*e* mounts the end of the sleeve cover 8 of the receptacle 1.

Figure 4A:
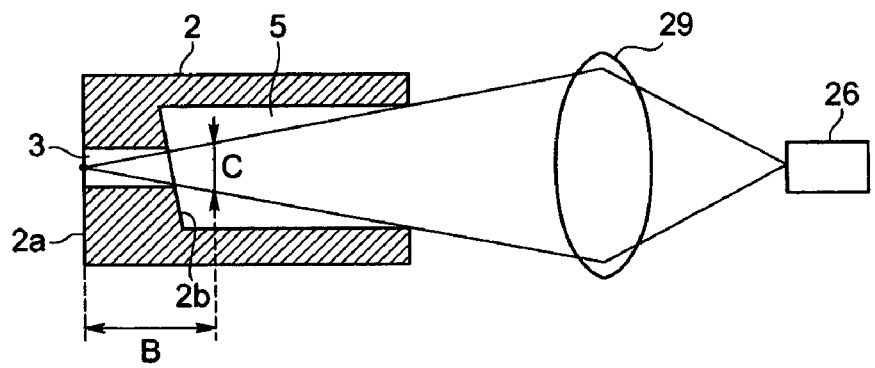
FIG. 4A is a schematic diagram showing the positional relation of the stub, the lens and the light-emitting device.
Figure 4B:
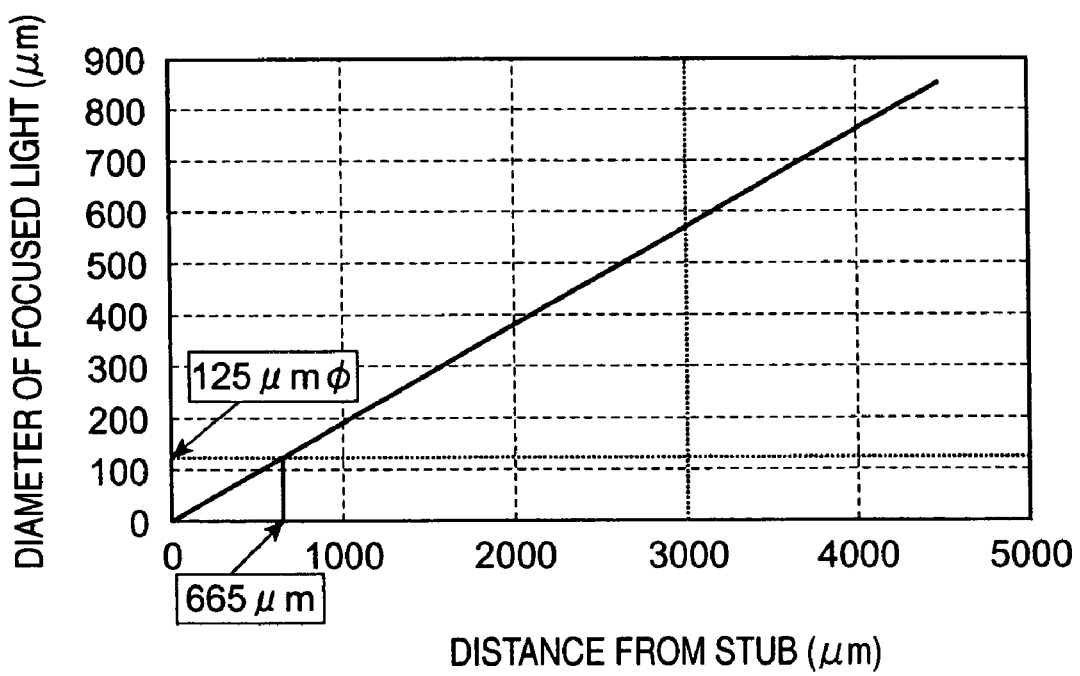
FIG. 4B shows the relation between the distance from the front surface of the stub and the field diameter of the light focused by the lens.

Next, specific dimensions of the first and second bores 3 and 5, of the receptacle 1 according to the present embodiment will be described. FIG. 4A schematically shows the positional relation of the light-emitting device 26, the lens 29, and the optical fiber 42, although not illustrated in FIG. 4A, which positions in the front end surface 2*a* of the stub 2. The light emitted from the light-emitting device 26 may focus on the end surface 2*a* of the stub 2. FIG. 4B shows a relation between a distance B from the front end surface 2*a* of the stub 2 and a diameter C of the light focused by the lens 29.

In FIG. 4B, it is understood that the distance at least about 0.665 mm from the front surface 2*a* of the stub is necessary to set the diameter of the light at the inner surface 2*b* about 0.125 mm, which is the diameter of the waveguide 4. Therefore, to focus the light by the lens 29 on the front surface 2*a* of the stub 2 and, at the same time, to guide the light in a most portion thereof into the waveguide 4 whose diameter is substantially equal to the diameter of the cladding of the optical fiber 42, the length L3 of the first bore 3 is required to be shorter than 0.665 mm.

On the other hand, when the distance L2 from the front surface 2*a* of the stub 2 is about 3 mm, the field diameter C of the light becomes about 0.565 mm. Therefore, when the total length L2 of the stub 2 is 3 mm, the inner diameter D5 of the second bore 5 is required to be greater than 0.565 mm to focus the light on the front surface 2*a* of the stub and, at the same time, to guide the light in a most portion thereof into the waveguide 4. Thus, preferable dimensions of the first and second bores, 3 and 5, may be evaluated.

The optical module 20 provides the light-emitting device 26. Therefore, the light emitted from the light-emitting device 26 can be transmitted to the optical fiber 42 in the connector plug 40 via the waveguide 4 in the optical receptacle 1. The waveguide 4 has enough diameters, i.e. the inner diameters, D3 and D5, of the first and second bores, 3 and 5, respectively, the light emitted from the light-emitting device 26 and passing the lens 29 may be concentrated on the front surface 2*a* of the stub where the tip of the optical fiber 42 abuts against without blocking by any portions of the stub 2, which enhances the optical coupling efficiency between the optical module 20 and the optical fiber 42.

Figure 5:
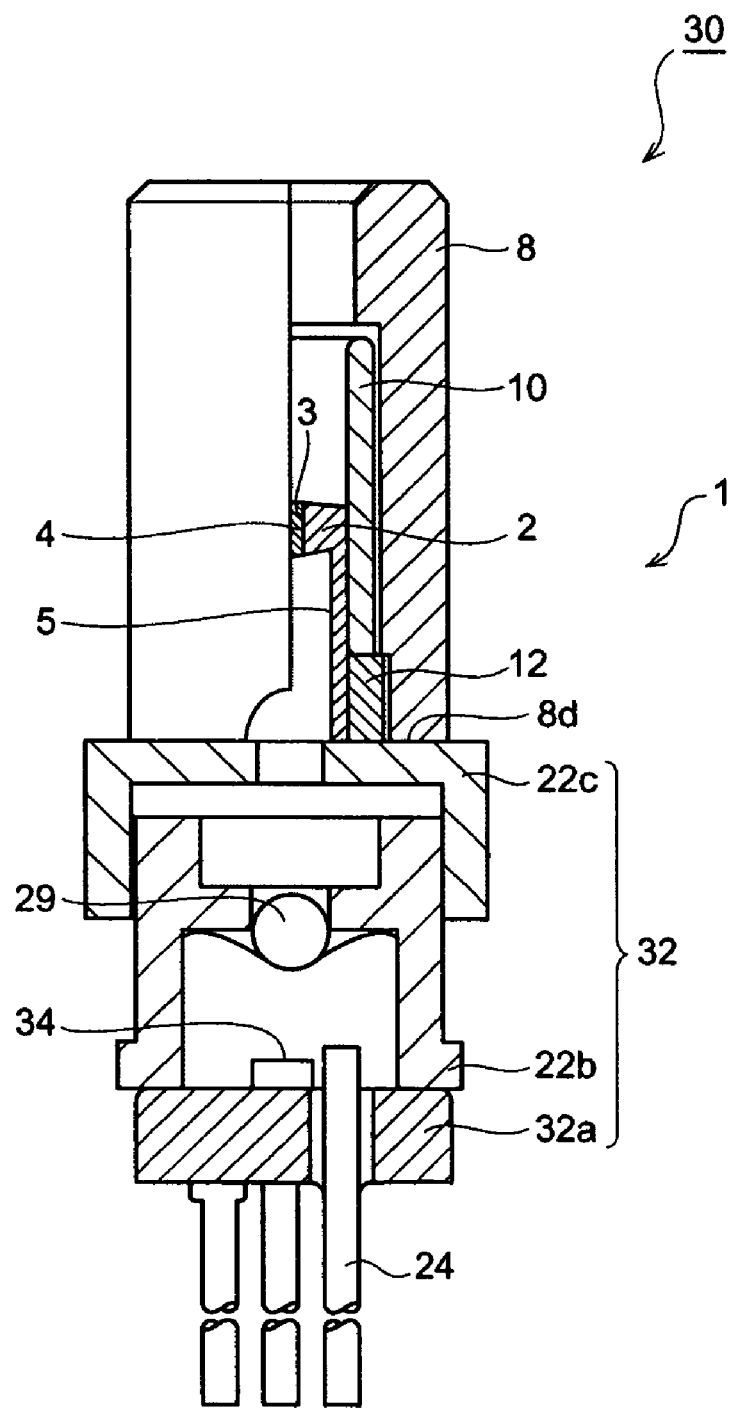
FIG. 5 is a partially sectional view of the light-receiving module with the optical receptacle of the invention.

FIG. 5 shows another embodiment according to the present invention. In the figure, the same symbols or numerals refers to the same elements with those appeared in the first embodiment without overlapping explanations. The optical module 30 includes the optical receptacle 1, and an optical device 32 disposed in the rear of the receptacle 1 and fixed to the sleeve cover 8 of the receptacle 1.

The optical device 32 in this embodiment, in stead of the light-emitting device 26, includes a light-receiving device 34 on the stem 32*a*. The light-receiving device 34 may be a PIN-PD made of compound semiconductor materials including InGaAs. The light emitted from the optical fiber 42, which comes in physically contact to the front surface 2*a* of the stub 2, may be received by the light-emitting device 34 via the waveguide 4 and the lens 29.

The present invention may be varied in the embodiment thereof not restricted to those described above. For instance, the first bore 3 of the stub 2 has a cylindrical shape with a constant diameter in the whole length thereof. However, the first bore 3 may have a tapered shape, i.e., the diameter at the inner surface 2*b* may be substantially equal to the diameter of the second bore S and may gradually decrease to the front surface 2*a*. Alternatively, the first bore 3 has a constant inner diameter, while the second bore 5 has a gradual diameter that is substantially equal to that of the first bore 3 at the rear surface 2*b* thereof and gradually increases to the end surface 2*b* thereof.

Moreover, the optical receptacle of the present invention may be applicable to the optical transceiver that includes both the optical transmitting module 20 with the laser diode therein and the optical receiving module 30 with the photodiode therein.

What is claimed is:

1. An optical receptacle for receiving an optical connector plug that secures an optical fiber with a core and a cladding surrounding the core, and for connecting the optical fiber with an optical device including a light emitting device, said optical receptacle comprising:

an optical waveguide made of material having a homogeneous refractive index;

a cylindrical stub with a uniform outer diameter, said stub including a first bore and a second bore continuous with said first bore, said first bore securing said optical waveguide therein at a location upstream of the optical fiber of an optical connector plug received by said optical receptacle, said second bore being at a location upstream of said first bore and downstream of the light emitting device of an optical device connected to an optical connector plug by said optical receptacle; and a sleeve having a first portion and a second portion along an optical axis of said sleeve, said first portion of said sleeve receiving a portion of said stub and said second portion of said sleeve receiving an optical connector plug, wherein said second bore of said stub has a diameter greater than a diameter of said first bore, and wherein a length of said second bore along an optical axis of said stub is longer than a length of said first bore along said optical axis.

2. The optical receptacle according to claim 1, wherein the diameter of said first bore of said stub is substantially equal to a diameter of the optical fiber at an interface between said first and said second bores.

3. The optical receptacle according to claim 2, wherein said waveguide has a convex surface together with said stub at a side opposite to said second bore so as to physically come into contact with the optical fiber when the optical connector plug is inserted into said sleeve.

4. The optical receptacle according to claim 1, wherein the refractive index of said waveguide is substantially equal to the refractive index of the core.

5. The optical receptacle according to claim 1, wherein an interface between said first and said second bores of said stub together with said waveguide is inclined with respect to said optical axis of said sleeve.

6. The optical receptacle according to claim 1, wherein said stub is made of zirconia.

7. The optical receptacle according to claim 1, wherein said stub is made of metal.

8. The optical receptacle according to claim 1, further comprising a sleeve cover and a bush, said bush being press-fitted between said stub in a side of said second bore and said sleeve cover such that said sleeve and said bush receive all of said stub and wherein said sleeve cover covers said sleeve and said bush.

9. The optical receptacle according to claim 1, wherein said waveguide is made of silica glass.

10. An optical module to be mated with an optical connector plug that secures an optical fiber therein, the optical module comprising:

an optical receptacle including an optical waveguide made of material having a homogeneous refractive index, a cylindrical stub with a uniform outer diameter, the stub including a first bore and a second bore, continuous with the first bore, the first bore being filled with the optical waveguide, the second bore having a diameter greater than a diameter of the first bore, and a sleeve having a first portion and a second portion along an optical axis of the sleeve, the first portion receiving a portion of the stub and the second portion receiving the optical connector plug;

an optical device including a stem for mounting a semiconductor optical device thereon and a cap for enclosing the semiconductor optical device co-operated with the stem;

a lens supported by the cap to focus light emitted from the semiconductor optical device; and an alignment member arranged between the optical receptacle and the optical device to optically align the optical receptacle with respect to the optical device, wherein the second bore is downstream of the semiconductor optical device and the lens, along the optical axis of the sleeve.

wherein the first bore is downstream of the second bore along the optical axis of the sleeve, wherein the diameter of the second bore at a side opposite to the first bore, the diameter of the first bore at an interface with the second bore, and a length of the first bore are determined such that the lens focuses the light on a surface of the first bore, opposite to the second bore, wherein a length of said second bore along the optical axis of said sleeve is longer than a length of said first bore along said optical axis.

11. The optical module according to claim 10, wherein the waveguide secured in the first bore of the stub has a convex surface in a side opposite to the second bore so as to physically come into contact with the optical fiber when the optical connector plug is inserted into the sleeve.

12. The optical module according to claim 10, wherein the first bore has a diameter gradually increasing from a surface that abuts against the optical fiber when the optical connector plug is inserted into the optical receptacle to an interface with the second bore.

13. The optical module according to claim 10, wherein the second bore has a diameter gradually increasing from the interface with the first bore to a side opposite the first bore.

14. The optical module according to claim 10, wherein an interface between the first bore and the second of the stub is inclined with respect to an optical axis of the sleeve by a predetermined amount.

15. The optical module according to claim 10, wherein the optical receptacle further includes a sleeve cover and a bush, the sleeve cover covering the sleeve, the bush being press-fitted between the stub in a side of the second bore and the sleeve cover such that the sleeve and the bush receives all of the stub, and wherein the alignment member fixes the sleeve cover thereto without fixing the bush and the stub.

16. The optical module according to claim 10, wherein a length of the first bore of the stub along the optical axis of the sleeve is shorter than a length of the second bore of the stub along the optical axis of the sleeve.

* * * * *